US010755558B2

(12) United States Patent
Fowe et al.

(10) Patent No.: US 10,755,558 B2
(45) Date of Patent: Aug. 25, 2020

(54) METHOD, APPARATUS, AND SYSTEM FOR DETECTING VENUE TRIPS AND RELATED ROAD TRAFFIC

(71) Applicant: HERE GLOBAL B.V., Eindhoven (NL)

(72) Inventors: James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 218 days.

(21) Appl. No.: 15/793,642

(22) Filed: Oct. 25, 2017

(65) Prior Publication Data
US 2019/0122541 A1    Apr. 25, 2019

(51) Int. Cl.
*G08G 1/01* (2006.01)
*G08G 1/07* (2006.01)
*G01C 21/36* (2006.01)

(52) U.S. Cl.
CPC ....... *G08G 1/0125* (2013.01); *G01C 21/3679* (2013.01); *G01C 21/3691* (2013.01); *G01C 21/3694* (2013.01); *G08G 1/0112* (2013.01); *G08G 1/07* (2013.01)

(58) Field of Classification Search
CPC ............. G01C 21/3694; G08G 1/0112; G08G 1/0125; G08G 1/07
See application file for complete search history.

(56) References Cited

U.S. PATENT DOCUMENTS

| | | | |
|---|---|---|---|
| 8,892,343 B2 | 11/2014 | Gupta et al. | |
| 9,171,462 B2 | 10/2015 | Hampapur et al. | |
| 9,437,107 B2 | 9/2016 | Scofield et al. | |
| 9,576,481 B2* | 2/2017 | Xu | G08G 1/0125 |
| 9,965,950 B2* | 5/2018 | Xu | G08G 1/0133 |
| 2014/0278031 A1* | 9/2014 | Scofield | G08G 1/00 701/118 |
| 2015/0120392 A1 | 4/2015 | Gharachorloo et al. | |

(Continued)

FOREIGN PATENT DOCUMENTS

| | | |
|---|---|---|
| EP | 2624533 A1 | 8/2013 |
| EP | 2674722 A2 | 12/2013 |

OTHER PUBLICATIONS

Guiyan et al., "Traffic Impact Evaluation for Large Special Events", Urban Transport of China, vol. 6, No. 5, May 2008, http://en.cnki.com.cn/Article_en/CJFDTOTAL-CSJT200805015.htm, 3 Pages.

(Continued)

*Primary Examiner* — Jerrah Edwards
(74) *Attorney, Agent, or Firm* — Ditthavong & Steiner, P.C.

(57) ABSTRACT

An approach is provided for detecting venue trips and related road traffic. The approach involves, for example, processing probe data to identify a trip related to the venue. The trip is traveled by a probe vehicle generating the probe data within a timeframe associated with an event occurring at the venue. The approach also involves generating an influence graph comprising one or more roads used by the probe vehicle during the trip. The approach further involves determining a traffic parameter for the one or more roads of the influence graph. The approach further involves computing a traffic impact score for the venue, the event, or a combination thereof based on the traffic parameter.

20 Claims, 13 Drawing Sheets

(56) References Cited

U.S. PATENT DOCUMENTS

2016/0153804 A1    6/2016  Fowe
2016/0321919 A1*  11/2016  Xu ..................... G08G 1/0125
2017/0352262 A1*  12/2017  Xu ..................... G08G 1/0112

OTHER PUBLICATIONS

Kwoczek et al., "Predicting Traffic Congestion in Presence of Planned Special Events", Research Paper, 2014, retrieved on Sep. 26, 2017 from https://pdfs.semanticscholar.org/f234/f844608d5f0cfa0b70ae85bc875df08c98f8.pdf, pp. 357-364.
Matsumoto et al., "Traffic Flow Control Using Probe Vehicle Data", Research Paper, 2010, retrieved on Sep. 26, 2017 from http://www.utms.or.jp/english/inter/paper/17-1paper.pdf, 8 Pages.

* cited by examiner

FIG. 8A

TRAFFIC MONITORING USER INTERFACE

| VENUE | TRAFFIC IMPACT SCORE |
|---|---|
| Movie Theater A | 7.8 |
| Dance Club A | 6.5 |
| Stadium A | 2.5 |
| Restaurant A | 1.0 |

541

METHOD, APPARATUS, AND SYSTEM FOR DETECTING VENUE TRIPS AND RELATED ROAD TRAFFIC

BACKGROUND

Providing real-time or up-to-date road traffic data is an area of interest for many mapping/navigation service providers and original equipment manufacturers (OEMs). For example, service providers and OEMs historically have published data to indicate traffic levels for various road links in mapped areas. However, service providers face significant technical challenges to determining how much, if any, of the observed traffic can be attributed to specific causes such as events occurring at venues or other points-of-interest. More specifically, there are many technical challenges related how to automatically detect and assess the overall impact that a venue or other similar point of interest has on regional road traffic.

SOME EXAMPLE EMBODIMENTS

Therefore, there is a need for an approach for detecting venue-related trips and related road traffic.

A computer-implemented method for detecting road traffic resulting from a venue comprises processing probe data to identify a trip related to the venue. The trip is traveled by a probe vehicle generating the probe data within a timeframe associated with an event occurring at the venue. The method also comprises generating an influence graph comprising one or more roads used by the probe vehicle during the trip. The method further comprises determining a traffic parameter for the one or more roads of the influence graph. The method further comprises computing a traffic impact score for the venue, the event, or a combination thereof based on the traffic parameter. In one embodiment, the method further comprises determining a weighting factor respectively for each of the one or more roads based on a count of how many times said each of the one or more roads is traveled in the trip or other venue-related trips occurring in the probe data. The traffic impact score is then determined by applying the weighting factor to the traffic parameter for said each of the one or more roads.

According to another embodiment, an apparatus for detecting road traffic resulting from a venue comprises at least one processor, and at least one memory including computer program code for one or more computer programs, the at least one memory and the computer program code configured to, with the at least one processor, cause, at least in part, the apparatus to process probe data to identify a trip related to the venue. The trip is traveled by a probe vehicle generating the probe data within a timeframe associated with an event occurring at the venue. The apparatus is also caused to generate an influence graph comprising one or more roads used by the probe vehicle during the trip. The apparatus is further caused to determine a traffic parameter for the one or more roads of the influence graph. The apparatus is further caused to compute a traffic impact score for the venue, the event, or a combination thereof based on the traffic parameter. In one embodiment, the apparatus is further caused to determine a weighting factor respectively for each of the one or more roads based on a count of how many times said each of the one or more roads is traveled in the trip or other venue-related trips occurring in the probe data. The traffic impact score is then determined by applying the weighting factor to the traffic parameter for said each of the one or more roads.

According to another embodiment, a non-transitory computer-readable storage medium for detecting road traffic resulting from a venue carries one or more sequences of one or more instructions which, when executed by one or more processors, cause, at least in part, an apparatus to process probe data to identify a trip related to the venue. The trip is traveled by a probe vehicle generating the probe data within a timeframe associated with an event occurring at the venue. The apparatus is also caused to generate an influence graph comprising one or more roads used by the probe vehicle during the trip. The apparatus is further caused to determine a traffic parameter for the one or more roads of the influence graph. The apparatus is further caused to compute a traffic impact score for the venue, the event, or a combination thereof based on the traffic parameter. In one embodiment, the apparatus is further caused to determine a weighting factor respectively for each of the one or more roads based on a count of how many times said each of the one or more roads is traveled in the trip or other venue-related trips occurring in the probe data. The traffic impact score is then determined by applying the weighting factor to the traffic parameter for said each of the one or more roads.

According to another embodiment, an apparatus for detecting road traffic resulting from a venue comprises means for processing probe data to identify a trip related to the venue. The trip is traveled by a probe vehicle generating the probe data within a timeframe associated with an event occurring at the venue. The apparatus also comprises means for generating an influence graph comprising one or more roads used by the probe vehicle during the trip. The apparatus further comprises means for determining a traffic parameter for the one or more roads of the influence graph. The apparatus further comprises means for computing a traffic impact score for the venue, the event, or a combination thereof based on the traffic parameter. In one embodiment, the method further comprises determining a weighting factor respectively for each of the one or more roads based on a count of how many times said each of the one or more roads is traveled in the trip or other venue-related trips occurring in the probe data. The traffic impact score is then determined by applying the weighting factor to the traffic parameter for said each of the one or more roads.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A and 8B are diagrams of example user interfaces for presenting traffic impact data for a venue, according to one embodiment;

DESCRIPTION OF SOME EMBODIMENTS

Examples of a method, apparatus, and computer program for detecting venue trips and related road traffic are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
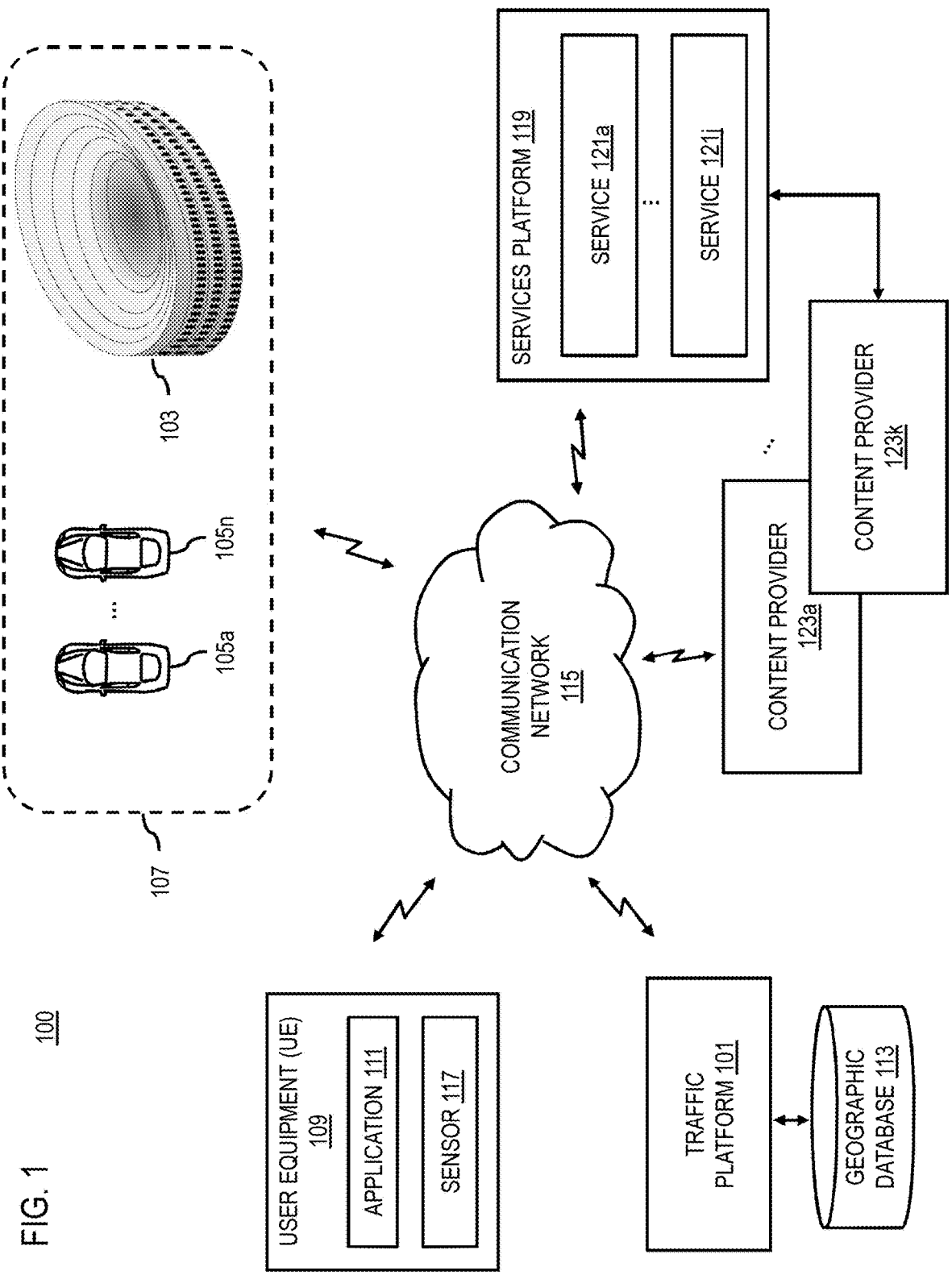
FIG. 1 is a diagram of a system for detecting venue trips and related road traffic, according to one embodiment.

FIG. 1 is a diagram of a system for detecting venue trips and related road traffic, according to one embodiment. Traffic Service Providers (TSPs), e.g., a traffic platform 101, have generally become very good at collecting and publishing traffic data. However, there are still many challenges with analyzing the impacts of venues (e.g., a venue 103) or other points of interest (POIs) on road traffic to improve traffic management, navigation routing, and/or other mapping/navigation services. The problem here falls under traffic engineering and transportation planning in which venues 103 can cause potentially huge effects on traffic conditions (e.g., created by vehicles 105a-105n, also collectively referred to as vehicles 105, traveling in a transportation or road network 107 surrounding the venue 103), but the true extent of the road traffic impact of these venues 103 are not well known. Traditionally, most traffic analysis around venues 103 and/or the events held at the venues 103 are done based on the popularity of the venues 103 or the size/volume of people that attend events in these venues 103. But in reality, highly popular and/or high-volume capacity venues 103 (e.g., a football stadium) do not necessarily mean that these venues 103 would have more impact on traffic than smaller venues 103 or POIs (e.g., a shopping mall, movie theater, music theater, etc.). In fact, some less popular or ignored venues 103 or POIs may actually have higher impact on traffic conditions.

In general, most TSPs have large volumes of probe data covering many cities around the world. However, this large volume of probe data (e.g., potentially millions of probe points collected in real-time) can require extension computing and/or bandwidth resources to process, particularly in real-time processing environments. As a result, TSPs face significant technical challenges to enabling real-time detection, monitoring, and reporting of venue-related traffic impacts.

To address these problems, a system 100 of FIG. 1 introduces a capability to efficiently use probe data to understand the impact venues 103, event centers, and other POIs have on traffic flow. For example, while government and Departments of Transportation (DOTs) are aware of the location of major venues 103 in a city, they historically do not know the type and/or the degree of impact each venue 103 has on traffic flow. Accordingly, in one embodiment, the system 100 implements a methodology, apparatus, and/or system to automatically detect vehicles 105 that are event venue bound and their impact on venue traffic. In this way, the system 100 can also identify the high traffic impacting venues 103 or POIs. In one embodiment, this quantified traffic impact can then be used as a tool to measure improvement or impact of interventions implemented by transportation agencies to mitigate the impacts on traffic around venues 103. For example, the system 100 can present a unique traffic management or mapping user interface (e.g., presented on a user equipment 109 executing an application 111 associated with the user interface) to show historical vehicle population analytics around venues 103 and better characterize the overall traffic flow around venues 103.

Figure 2:
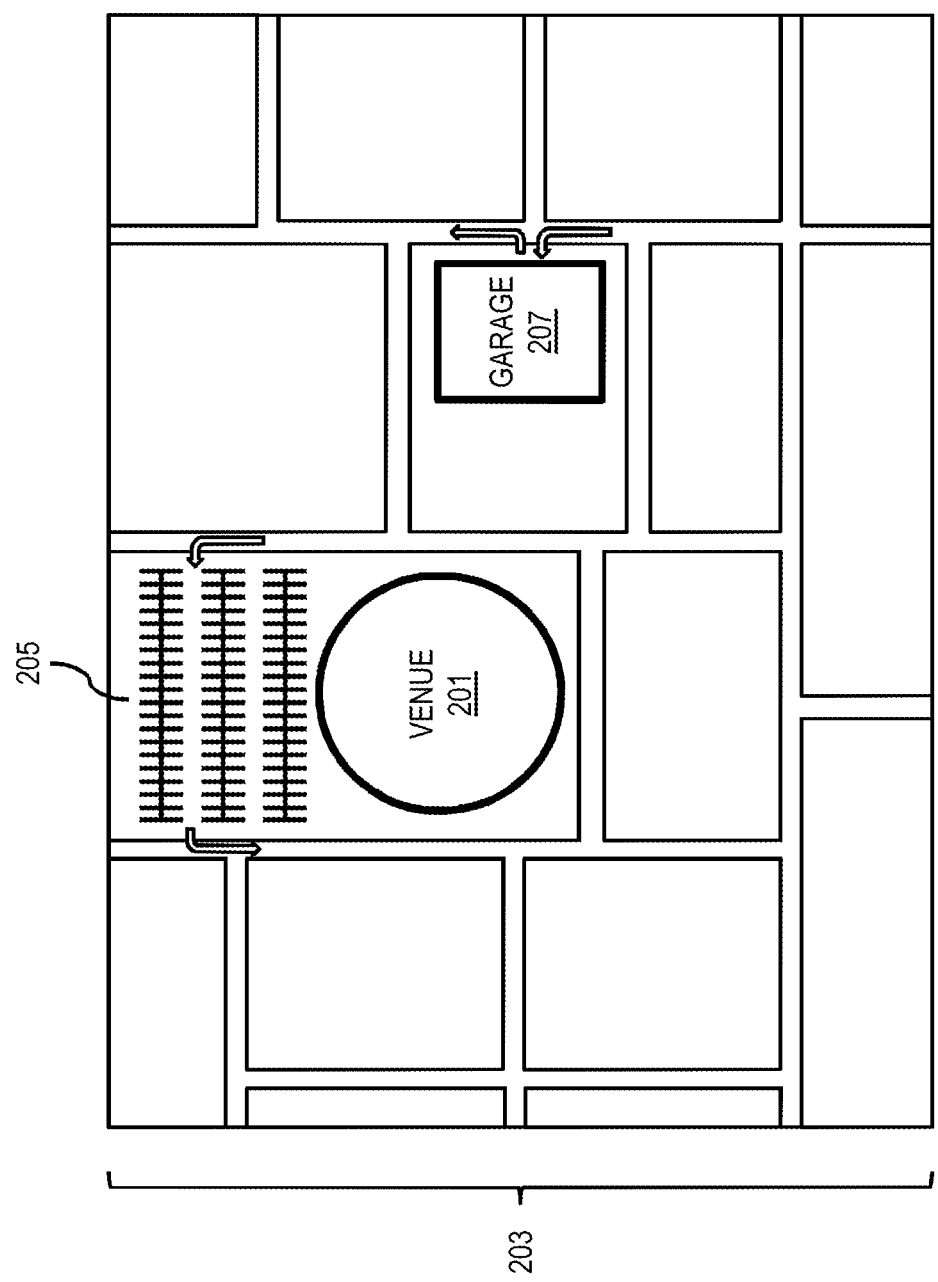
FIG. 2 is diagram illustrating an example venue that acts as a traffic sink and/or source, according to one embodiment.

In one embodiment, the system 100 can advantageously help traffic engineers discover high traffic impacting venues 103 or POIs based on how much traffic congestion they create in the neighboring road network 107. For example, FIG. 2 is diagram illustrating an example venue 201 that acts as a traffic sink and/or source within the transportation network 107, according to one embodiment. As shown in FIG. 2, the road network 203 around the venue 201 would be impacted if all the cars in the parking lot 205 drive in (e.g., at the start of an event at the venue 201 when the venue 201 acts as a sink for road traffic) or drive out (e.g., at the end of an event at the venue 201 when the venue acts a source of road traffic) within the same time window. Trips to and from the venue 201 over the road network 203 are referred to as venue-related trips. In addition, trips to and from related structures or POIs (e.g., the parking lot 205 or a nearby affiliated garage 207) within the same time window can also be classified as a venue related trip.

In one embodiment, identification of venue-related trips from the probe data enables the system 100 to advantageously reduce the volume of available probe data to determine the traffic impacts caused by a venue 103 and/or an event occurring at the venue 103. This in turn can result in reduced computing and/or bandwidth resources used by the system 100 to evaluate traffic impacts. In other words, the system 100 determines or models the impact of the venue 103 on road traffic by analyzing the traffic condition on just the roads traversed by trips related to the venue when an event is happening.

The system 100 can then help traffic engineers, state DOTs, and/or other users to better understand the impact of events at venues 103 or POIs in their city. For example, some high capacity venues 103 may impact or not impact traffic road conditions due to larger and accessible roads around the venues 103 or because the venues 103 are not in the center of the city. In one embodiment, the system 100 can use real GPS probe data to measure the negative impact of traffic congestion that venues 103 cause and then rank venues based on this measured impact. This list can help state DOTs plan better around venues 103 by knowing the most critical venues 103 having greatest impact on traffic. The traffic impact data from the system 100 can also help traffic engineers react to events at these venues (e.g., in real time or in batch processes).

In one embodiment, the system 100 determines traffic impact data for a venue 103 by using a traffic surprise propagation algorithm that track roads segments influenced by the venue, that are discovered through trip data analysis. In one embodiment, a "traffic surprise" refers to road traffic conditions that are a significant departure from the norm (e.g., the normal recurrent historical traffic pattern) either positive (e.g., surprising free flow condition) or negative (e.g., surprising congestion). In one embodiment, the output is a ranking of all venues or POIs in a city based on their degree of impact on traffic.

In one embodiment, the system 100 can report the most critical events in real-time using the model in this document. In addition or alternatively, the system 100 can run offline analytics to support traffic engineering and transportation planning. In yet another embodiment, users can query (e.g., a geographic database 113 storing the traffic impact data) for a particular venue 103 or POI and get a measurement of its impact on traffic (e.g., a traffic impact score) relative to other venues 103.

Figure 3:
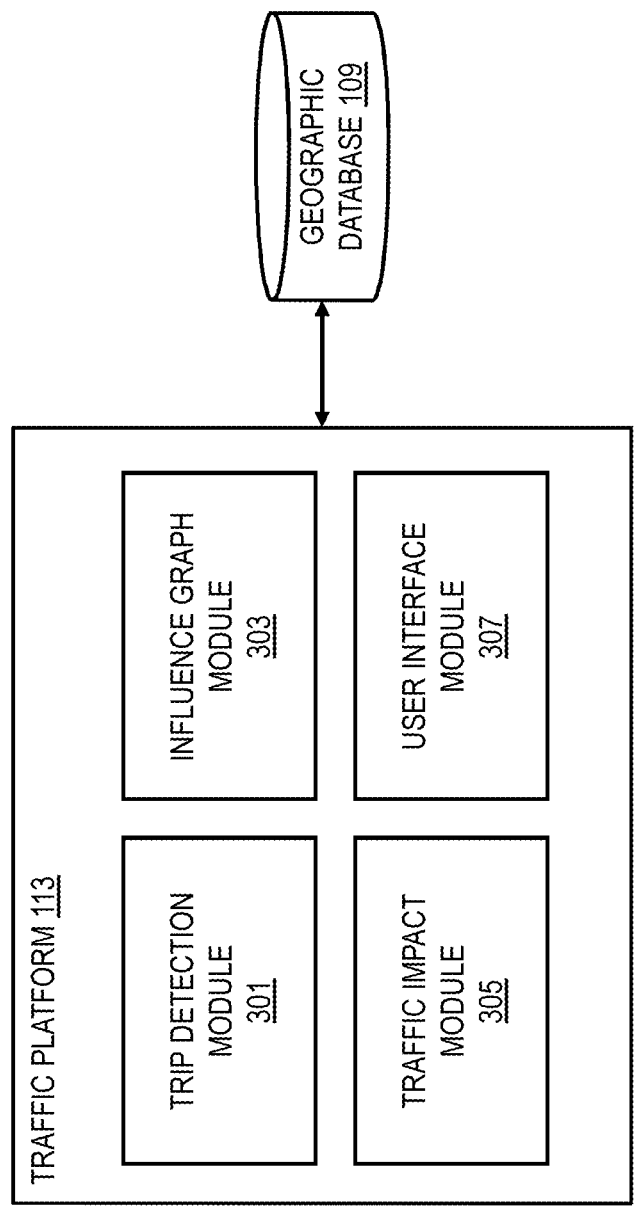
FIG. 3 is a diagram of the components of a traffic platform, according to one embodiment.

FIG. 3 is a diagram of the components of a traffic platform, according to one embodiment. In one embodiment, the traffic platform 101 is an example of a TSP platform for performing the process for detecting venue trips and related road traffic according to the various embodiments described herein. As shown FIG. 3, the traffic platform 101 includes one or more components. It is contemplated that the functions of these components may be combined or performed by other components of equivalent functionality. In one embodiment, the traffic platform 101 includes a trip detection module 301, an influence graph module 303, a traffic impact module 305, and a user interface (UI) module 307. The above presented modules and components of the traffic platform 101 can be implemented in hardware, firmware, software, or a combination thereof. Though depicted as a separate entity in FIG. 1, it is contemplated that the traffic platform 101 may be implemented as a module of any of the components of the system 100 (e.g., a component of the vehicle 105, UE 109, and/or application 111). In another embodiment, one or more of the modules 301-307 may have connectivity to a communication network 115 and may be implemented as a cloud based service, local service, native application, or combination thereof. The functions of these modules are discussed with respect to FIGS. 4-8 below.

Figure 4:
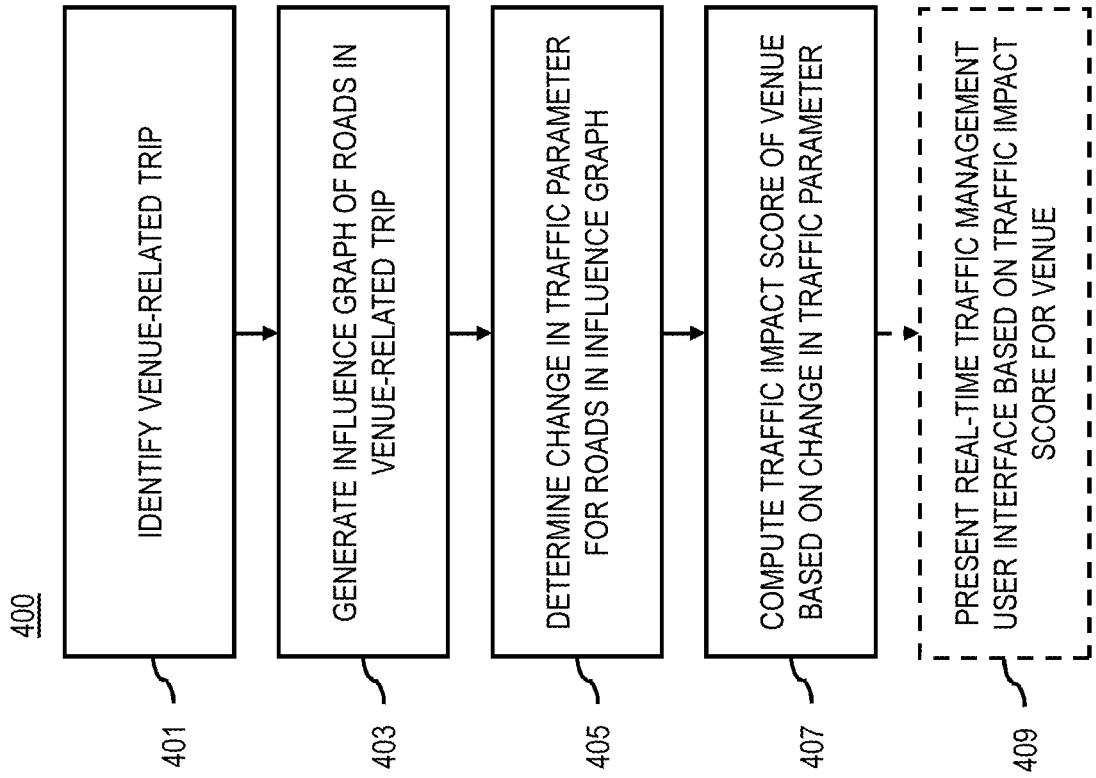
FIG. 4 is a diagram of a process for detecting venue trips and related road traffic, according to one embodiment.
Figure 11:
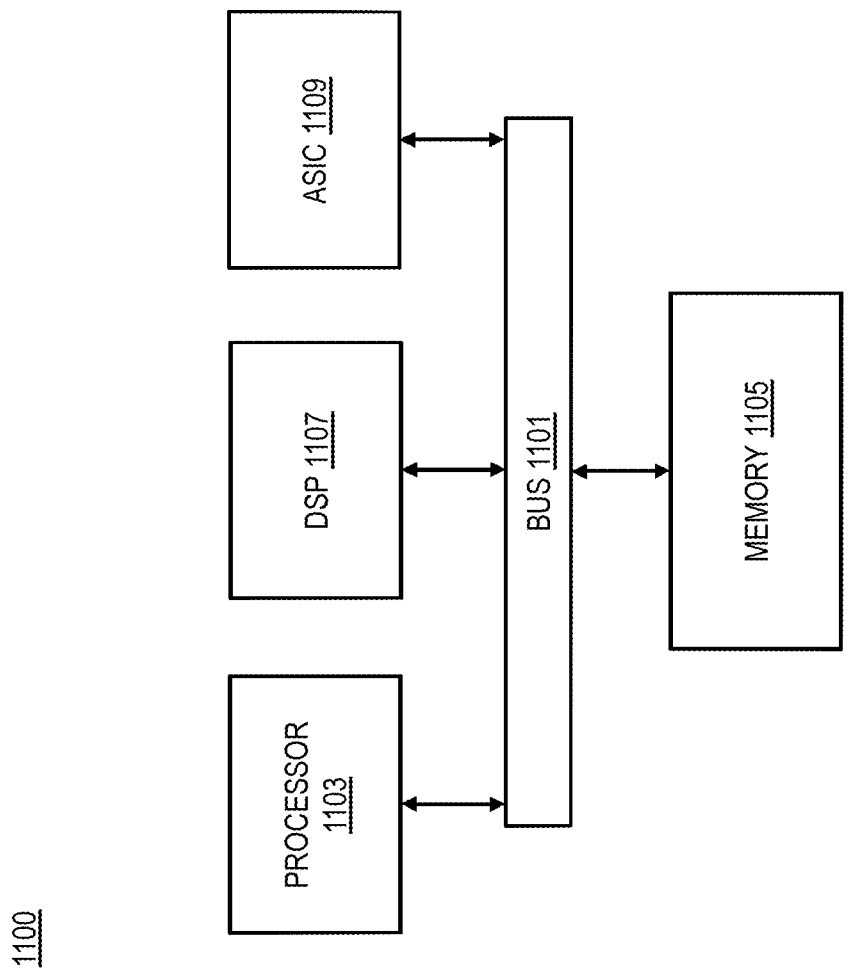
FIG. 11 is a diagram of a chip set that can be used to implement an embodiment.

FIG. 4 is a diagram of a process for detecting venue trips and related road traffic, according to one embodiment. In various embodiments, the traffic platform 101 and/or any of the modules 301-307 of the traffic platform 101 as shown in FIG. 3 may perform one or more portions of the process 400 and may be implemented in, for instance, a chip set including a processor and a memory as shown in FIG. 11. As such, the traffic platform 101 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the trip detection module 301 processes probe data to identify a trip related to a venue 103. By way of example, the trip is traveled by a probe vehicle generating the probe data within a timeframe associated with an event occurring at the venue. In one embodiment, the trip detection module 301 can define what types of trips are directly related to a venue. The process that is used for detecting and analyzing the venue trip can then be based on trip type detected in the probe data. By way of example, a trip is a probe trajectory contained in the probe data that represents a sequence of probe points collected by a single probe vehicle during on probe collection session.

In one embodiment, the system 100 defines four trip types that can be influenced by the venue 103 during an event:
  (1) Drop-off trip: Cars stopping by the venue 103, dropping someone off, and then leaving. This is a typical situation for Taxis and Car sharing services.
  (2) Park-arrive trip: Cars parking in proximity of the venue 103 (e.g., at the venue 103 or nearby parking facility) during an event.
  (3) Park-leave trip: Cars starting their trip from very close to the venue 103 (e.g., at the venue 103 or nearby parking facility).

(4) Pick-up trip: Similar to drop-off trips, cars are stopping by the venue 103 and restarting their trip after picking someone up.

In one embodiment, the trip detection module 301 uses time as a parameter for distinguishing these types of venue-related trips from other non-venue-related trips in the available probe data. As such, the trip detection module 301 identifies the trips or probe trajectories based on whether the trip occurs close in time with respect to an event occurring at the venue. This is based on an observation that trips influenced by the venue 103 can only exist during (or close to) events occurring at the venue 103. For example, people usually arrive at a venue 103 or POI just before events and leave just after, so the trip detection module 301 defines the concept of an allowed-arrive timeframe and allowed-leave timeframe for identifying venue-related trips. Accordingly, park-arrive trips and Drop-off trips can only happen inside the allowed-arrive timeframe, while Park-leave trips and Pick-up trips can only happen during the allowed-leave one.

In other words, in one embodiment, the timeframe for identifying a venue-related trip includes an allowed-arrive timeframe, an allowed-leave timeframe, or a combination thereof. The trip detection module 301 determines the allowed-arrive timeframe based on a start time of the event (e.g., occurring within a threshold time period of the start time of the event). Venue-related trips are then identified based on determining that the probe vehicle associated with a particular trip or probe trajectory arrives at the venue 103 within the allowed-arrive timeframe. Similarly, the trip detection module 301 determines the allowed-leave timeframe based on an end time of the event, and the venue-related trip is identified based on determining that the probe vehicle leaves the venue 103 within the allowed-leave timeframe.

In one embodiment, the trip detection module 301 makes a further distinction for determining the applicable trip selection timeframes based on an event type of the event occurring at the venue 103. In this way, the trip detection module 301 determines a respective length of the allowed-arrive timeframe, the allowed-leave timeframe, or a combination thereof based on an event type of the event. The event type includes, but is not limited to, at least one of a static event type with a fixed length and a flowing event with no fixed length. For example, flowing events include events such as fairs, outdoor markets, all-day events, etc. during which people can typically come or go at any time during the event. Accordingly, people can arrive much later than the start of the event and leave way before it ends, meaning that the event, in effect, has no fixed length. In contrast, static events include events such as concerts, sporting events, movie/theater plays, etc. Typically, the durations of the static events are strictly schedule, so that people should arrive just before its start and leave just after its end.

Figure 5:
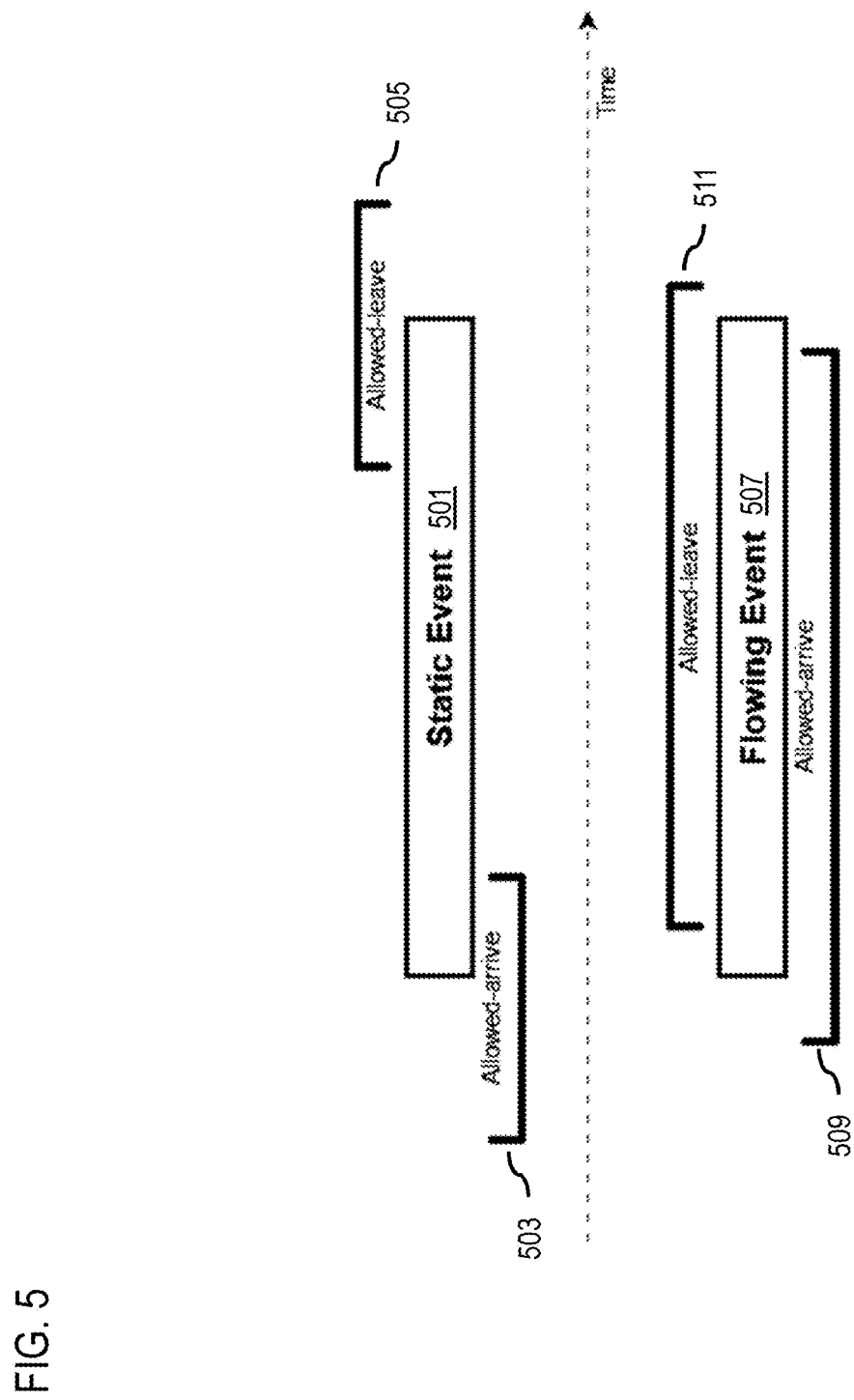
FIG. 5 is a diagram illustrating trip arrival and departure timeframes for an event occurring at a venue, according to one embodiment.

With this distinction in mind, the trip detection module 301 can define the two detection time windows (e.g., allowed-arrive and allowed-leave timeframes) for both types of event as shown in FIG. 5. For example, a static event 501 will have an allowed-arrive timeframe 503 and an allowed-leave timeframe 505 that are typically shorter in duration and are non-overlapping. The allowed-arrive timeframe 503 spans a period of time from before the start of the static event 501 to a period of time shortly after the start of the static event 501. In one embodiment, have much before or after the allowed-arrive timeframe 503 spans can be based on any criteria including, but not limited, event type, historical data, venue type, and/or other contextual parameters (e.g., time of day, day of week, weather, activity, etc.). Similarly, the allowed-leave timeframe 505 spans a period of time shortly before the end of the static event 501 to a time after the end of the static event 501 (e.g., the duration of the allowed-leave timeframe 505 can be based on the same factors/criteria as for the allowed-arrive timeframe 503. As shown, for a flowing event 507 where the event duration is not as strictly scheduled, the allowed-arrive timeframe 509 can span from before the start of the flowing event 507 to before the end of the flowing event 507, and the allowed-leave timeframe 511 can span from after the start of the flowing event 507 to after the end of the flowing event 507. The exact times and durations of the timeframes 509 and 511 of the flowing event can also be based on the factors/criteria described with respect to the static event 501. In one embodiment, these detection windows or timeframes represent the times where the trip detection module 301 will search the probe data for venue-related trips. For instance, the trip detection module 301 will not look for park-arrive trips after the end of an event, or park-leave events before the start of the event.

In one embodiment, to further limit the probe data trajectories that can be potentially classified as venue-related trips, the trip detection can add a spatial parameter to determine whether a trip falling within the timeframe(s) of a venue event is "venue-caused", meaning that the probe vehicle 105 is driving on a road because of an event at the venue 103 under analysis.

In one embodiment, the trip detection module 301 identifies the venue-caused or venue-related trips based on the trip types described above. For example, to identify park-arrive or park-leave trips, the trip detection module 301 searches the available probe data to look for trips ending close to the venue 103 during the allowed-arrive timeframe, or starting close to the venue 103 during the allowed-leave timeframe. In one embodiment, the meaning of "close to the venue" in this situation could mean close in terms of geospatial distance, but we could also store adjacent or nearby parking spots/facilities to the venue 103 in an artifact and monitor those locations.

In one embodiment, to identify venue-related trips that are drop-off or pick-up type events, the trip detection module 301 can use a vehicle traffic state detection process or equivalent. For example, the trip detection module 301 can use real-time processing (or offline analytics) of probe data (e.g., GPS probe data) to predict or detect the motion-state of a vehicle 105 or its traffic condition. For example, having data on the motion-state of a vehicle 105 at a microscopic level (i.e., a per-vehicle level) brings immense opportunities to an intelligent traffic system (ITS) because the trip detection module 301 is able to dynamically determine the state of the fundamental object in transportation road network 107 (i.e., the vehicle 105).

In one embodiment, the traffic-state of a vehicle 105 is predicted by observing the probe trajectory on a single road segment. The trip detection module 301 algorithmically inspects the speed and interprobe time frequency and distance between each probe point in the probe trajectory to ascertain which traffic state/condition the vehicle 105 may be in. For example, the states or conditions can include, but is not limited to: "heavy congestion"; "light congestion"; "temporary stop"; "parked"; "free-flowing"; etc. Each of these states has a characteristic combination of speed and interprobe time frequency and distance that the trip detection module 301 can use to classify the state of the vehicle 105.

Figure 6:
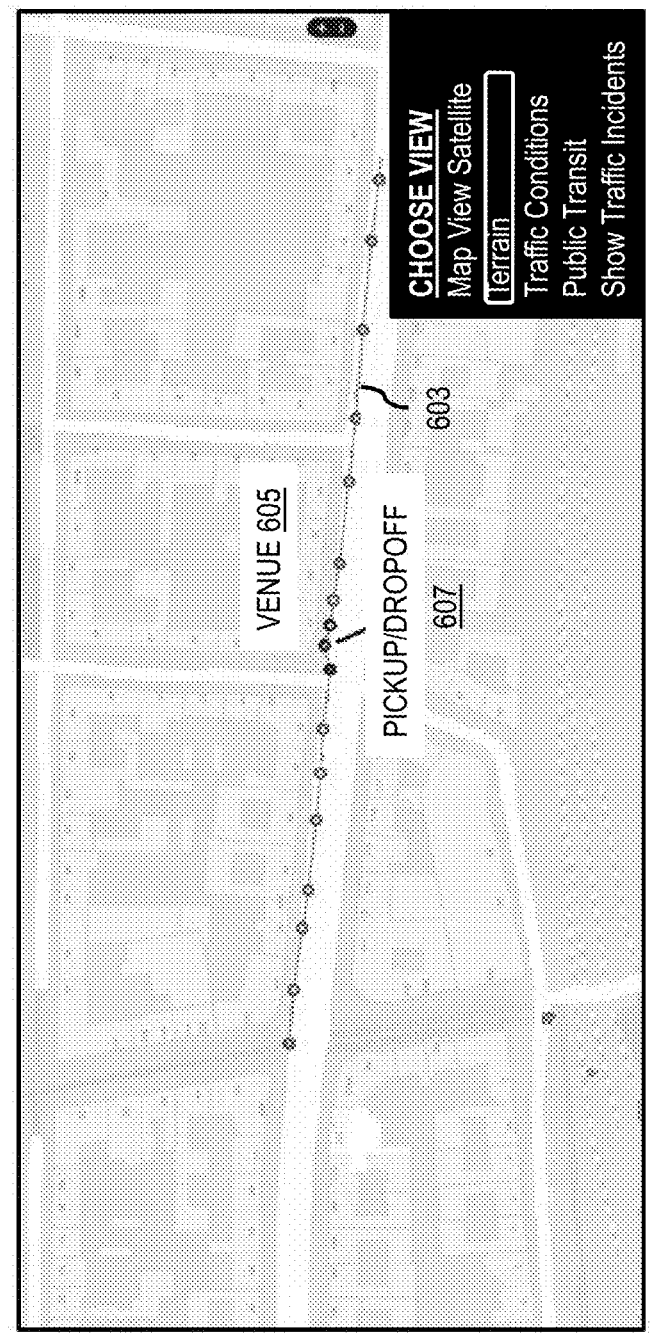
FIG. 6 is a diagram illustrating detecting a pick-up/drop-off trip type with respect to a venue, according to one embodiment.

For detecting drop-off and/or pick-up trips, the trip detection module 301 is particularly interested in the "temporary stop" traffic state. FIG. 6 is a diagram illustrating detecting a pick-up/drop-off trip type with respect to a venue using a temporary stop traffic state, according to one embodiment. As shown, the map 601 depicts a probe trajectory 603 collected from a probe vehicle 105 traveling to a venue 603. The probe trajectory 603 comprises a sequence of probe points that have varying interprobe frequency or distances resulting from speed variations of the probe vehicle 105. In this example, a temporary stop is identified based on a decrease in interprobe distance followed by an equal increase. The trip detection module 301 can use then designated the temporary stop location as a pick-up or drop-off trip depending on the timeframe in which the temporary stop occurs. For example, in one embodiment, the trip detection module 301 can identify or detect those trips that were in a "temporary stop" case very close to the venue 103. If the temporary stop by the probe vehicle 105 occurs during the allowed-arrival timeframe, the trip detection module 301 identifies the trip as a drop-off venue-related trip. Similarly, if the temporary stop by the probe vehicle 105 occurs during the allowed-leave timeframe, the trip detection module 301 identifies the trip as a pick-up venue-related trip.

In other words, the trip detection module 301 determines that the trip is a drop-off trip or a pick-up trip when the temporary stop location is associated with or close by the venue. In one embodiment, the trip detection module 301 determines which portion of the drop-off trip or the pick-up trip to use for determining the one or more roads associated with the trip based on whether the probe vehicle reaches the temporary stop location during the allowed-arrive timeframe or the allowed-leave timeframe as further described below.

After the trip detection module 301 identifies venue-related trips with respect to a selected venue 103, the trip detection module 301 interacts with the influence graph module 303 to define the influence graph generated by these trips. Accordingly, in step 403, the influence graph module 303 generates an influence graph comprising one or more roads used by the probe vehicle 105 during the trip. In one embodiment, the influence graph can be a combined graph comprising roads used to arrive at the venue 103 (e.g., upstream roads) as well as road used to leave the venue 103 (e.g., downstream roads). In addition or alternatively, the influence graphs can include separate graphs for an upstream influence graph comprising the one or more roads that are used by the probe vehicle 105 before arriving at a location associated with the venue 103, and for a downstream influence graph based on the one or more roads used by the probe vehicle 105 after leaving the location associated with the venue 103. For example, by constructing two different influence graphs: a downstream influence graph and an upstream influence graph, the influence graph module 303 can show the traffic impact at the start of the event and at the end of it separately. In other embodiments, the influence graph module 303 can merge the downstream and upstream graphs to provide the overall traffic impact.

In one embodiment, the influence graph module 303 builds the influence graphs by analyzing the roads taken by the venue-related trips before or after stopping at the venue 103. For instance, for the upstream graph, the influence graph module 303 will only look at park-arrive trips and at the first section of drop-offs/pick-up trips (before the temporary stop close to the venue) to construct the graph. To construct the graph, each time one of these trips traverses a link or road identified from the venue-related trip, the influence graph module 303 increases a counter associated with it. In one embodiment, after the influence graph module 303 does this for all of the identified venue-related trips (e.g., related to a venue 103 and/or a particular event occurring at the venue 103 per the temporal/spatial criteria described above), the influence graph module 303 divides each counter by the total number of trips analyzed to normalize the value. The result will be, for every link in the road network 107, the percentage of vehicles going to the venue 103 (e.g., for an event) that traversed it. In one embodiment, this percentage can be referred as WL or a weighting factor for a link or road segment. In one embodiment, WL can be used to give a greater weight the traffic impact of the venue 103 on the most common links (e.g., links with the greater values of WL).

Figure 7:
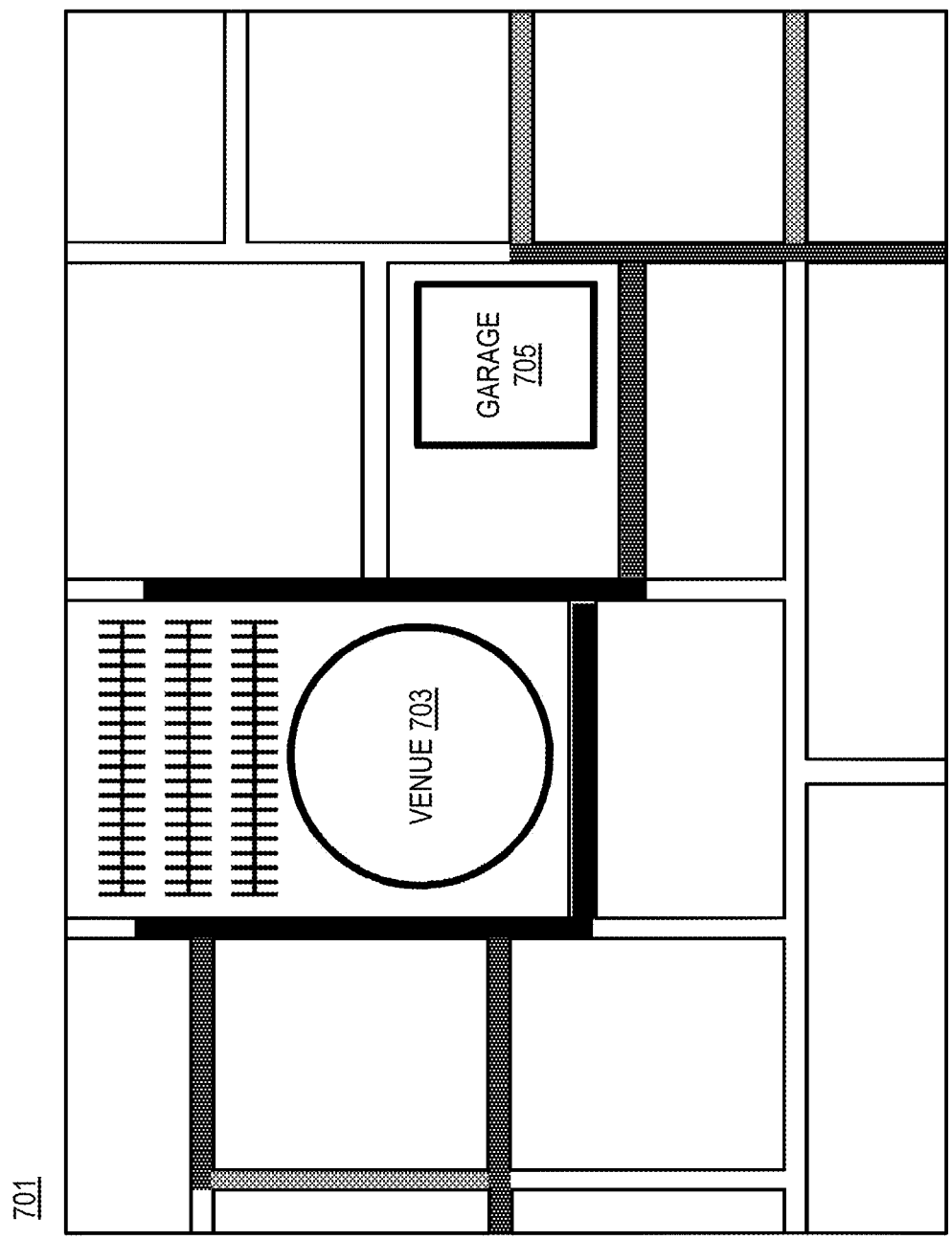
FIG. 7 is a diagram illustrating influence graphs comprising road links identified from venue trips, according to one embodiment.

In one embodiment, the UI module 307 can present a user interface depicting a visual representation of the influence graph or graphs as shown in FIG. 7. The visual representation of the influence graph 701 of FIG. 7 depicts a road network near a venue 703 and associated parking garage 703. The influence graph 701 is an example in which the upstream and downstream influence graphs that represents both the roads used to arrive at the venue 703 for an event and the roads used to leave the venue 703 following an event. In this example, the share of vehicles going to or leaving the venue 703 and/or garage 705 that used a road link or segment is represented using a shading scale going from white to black. Under this visual sale, darker shaded road links indicate that the links are used more often (e.g., have higher WL values) when going to or leaving the venue 703 and/or 705, while lighter shades are used less often, with white being the least used.

After the influence graph module 303 creates the influence graphs to determine which road links or segments are used by vehicles 105 going to or leaving from a venue 103, the influence graph module 303 interacts with the traffic impact module to analyze how traffic on the links included in the influence graphs change when an event is happening at the venue 103. Accordingly, in step 405, the traffic impact module 305 determines a traffic parameter for the one or more roads of the influence graph. In one embodiment, the traffic parameter includes, but is not limited to, a traffic jam factor, a traffic speed parameter, a traffic volume parameter, or a combination thereof. In one embodiment, the traffic impact module 305 analyzes the selected traffic parameter to determine whether there is a "surprise" (e.g., an observed traffic parameter value that is significantly different from a recurrent or historical traffic parameter value) on a link of interest. Although the various embodiments are discussed with determining traffic changes based on a jam factor, traffic speed, traffic flow, or a combination thereof, it is contemplated that any other equivalent traffic parameter known in the art may be used.

For example, in one embodiment, the traffic impact module 305 can use a jam factor surprise (JFS) to determine the traffic impacts of the venue 103 on the roads in its influence graph. Using probe data, the traffic impact module 305 measures the level of traffic congestion using a Jam-factor (JF) variable that compares current traffic speed with free flow (FF) speed of a given road link or segment (link) as expressed below:

$$JF_{link}=FF_{link}/Speed_{link} \quad (1)$$

The JF of a link in a transportation network 107 is as described in equation (1). The higher the JF is, the more congested the road is.

In one embodiment, to compute the degree of impact of events at venues 103 on the neighboring road links or segments of the transportation network 107, the traffic impact module 305 tracks the surprise in traffic speed across the road-segments in the region of influence (e.g., the road links included in the influence graph). By way of example, Traffic Speed Surprise (TSS) is the difference between the current real-time speed and the historical norm (TP speed). The surprise seen in congestion JFS (JF Surprise) which is the change in the JF value, is the difference between current JF compared to historical average JF.

In step 407, the traffic impact module 305 computes a traffic impact score for the venue, the event, or a combination thereof based on the traffic parameter (e.g., JFS). In one embodiment, the traffic impact module 305 uses a measuring algorithm to generate traffic impact (TI) scores for each venue using the weighted summation of JFS (or changes/surprises with respect to other traffic parameters) producing an indication of how bad traffic is upstream to the venue or downstream to the venue. This is because congestion can be an accurate measure of the impact of an event in a venue 103 and its neighboring road-segments. The higher the TI score the higher the impact such venues 103 have on traffic in the road network 107. In one embodiment, for each link, FFS is calculated as the maximum selected from a set including a zero value, and the difference of the current jam factor ($JF^R$) and the historical jam factor ($JF^H$), which is expressed as follows:

$$JFS_{link} = \max(JF_{link}^R - JF_{link}^H, 0) \quad (2)$$

In one embodiment, the traffic impact module 305 determines a weighting factor respectively for each of the one or more roads based on a count of how many times said each of the one or more roads is traveled in the trip or other venue-related trips occurring in the probe data (e.g., as determined according to the embodiments described above). The traffic impact (TI) score is determined by applying the weighting factor to the traffic parameter for said each of the one or more roads. The TI score or value for a venue 103 can therefore be expressed as:

$$TI_V = \sum_{L \in V_U} (W_L * JFS_L) + \sum_{L \in V_D} (W_L * JFS_L) \quad (3)$$

Where $V_U$ is the upstream influence graph, $V_D$ is the downstream influence graph, and WL is the percentage of cars traversing the link in the influence graph.

In one embodiment, the TI metric represents the traffic impact a venue 103 generates on the road network 107, so it can be used in any number of uses cases. For example, depending on the user case, users of the system 100 (e.g., the traffic platform 101) can include, but is not limited to, government clients (DOTs, municipal traffic engineers, etc.), retail companies, advertisement agencies, and/or the like. In one embodiment, the traffic platform 101 can be used to generate a list of venues 103 and their respective TI values or scores in real-time or an offline batch mode. The list of venues would enable a state government's DOT, traffic engineers, etc. to assign appropriate resources for traffic control around known events at certain venues 103. In one embodiment, the list can be ranked according to TI scores to more easily visualize problematic venues.

In one embodiment, the UI module 307 can optionally presents a traffic management user interface to depict a user interface element representing the traffic impact score with respect to the venues 103, the one or more roads, or a combination thereof (optional step 409). For example, FIG. 8A illustrates an example traffic management user interface 801 for presenting a simple ranked list of venues 103 based on their respective TI scores, according to one embodiment.

In one embodiment, the traffic impact score for a plurality of venues can be computed based on real-time probe data for presentation in the traffic management user interface when real-time monitoring of venue-related traffic is requested. Accordingly, the ranked list of the UI 801 can be updated in real-time to show the most problematic venues 103 as their impacts on traffic are felt.

Figure 8B:
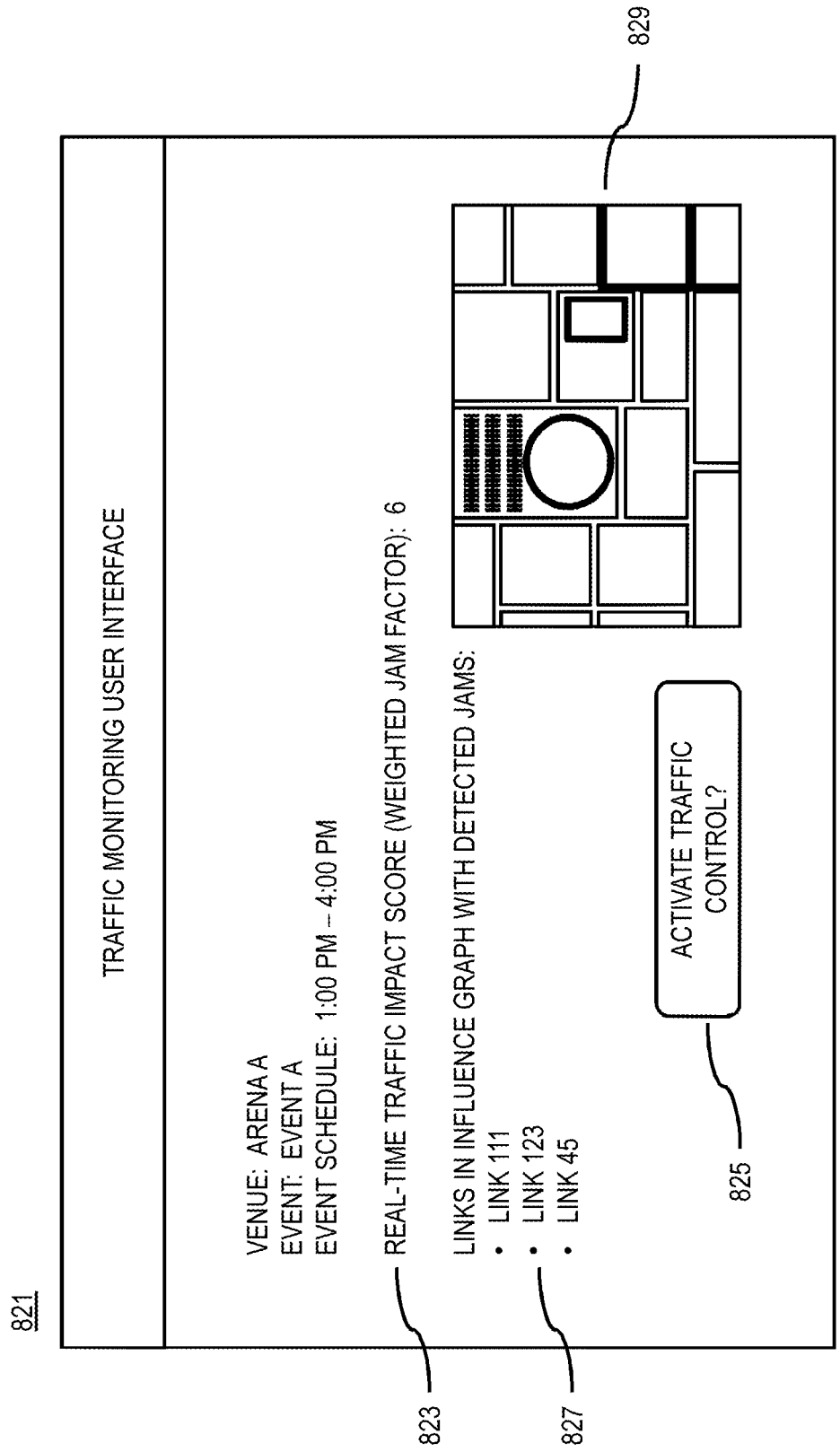

FIG. 8B illustrates another example traffic management user interface 821 that illustrates and example of monitoring a UI element 823 representing the traffic impact score for a "Venue A" during an "Event A". In this example, the UI 821 also provide another user interface element 825 for initiating a traffic engineering change. The traffic engineering change can include, but is not limited to, changing a traffic light cycle, changing a travel lane direction, or a combination thereof. The real-time impact of these changes can then be monitored based on real-time updating of the TI score presented in the UI element 823. In one embodiment, the UI 821 can present additional information such as a list 827 of the most affected links in the influence graph of the Venue A, as well as a map UI element 829 to display a traffic map of the areas surrounding the Venue A. As a result, instead of making a guess based on attendance or other attributes, the traffic impact data presented in the traffic management UI 821 (or UI 801 of FIG. 8A) can be used to identify the expected trip volume and the impact to traffic and allow some of that congestion to be eased with proper traffic engineering (changing traffic light cycles, changing express lane directions, etc.).

In one embodiment, the traffic impact data (e.g., real-time data) can be generated on demand for users (e.g., municipalities). Users such as retailers, advertisement agencies, and/or the like can use the venue-related traffic impact data to know the volume and types of trips around their respective venues (e.g., average traffic flow, vehicle wait times, etc.) based on specific events occurring at their shops (e.g., sales events, special promotions, etc.). In addition, retailers, advertisers, etc. can evaluate whether there is sufficient ease of access to their locations (e.g., determining whether or not they are affected by events at other nearby venues 103). It is noted that the example uses cases described above are provided by way of illustration and not as limitations.

Returning to FIG. 1, the traffic platform 101 has connectivity to a probe data collection infrastructure comprising, for instance, probe vehicles 105, UEs 109 acting as probe devices, traffic sensors embedded in the road network 107 (not shown), and/or the like. In one embodiment, the vehicles 105 and/or the probe UEs 109 associated with a vehicle 105 can act as probes traveling over the road network 107 represented in the geographic database 113. Although the vehicles 105 are depicted as automobiles, it is contemplated that the vehicles 105 can be any type of transportation vehicle manned or unmanned (e.g., planes, aerial drone vehicles, motor cycles, boats, bicycles, etc.). In one embodiment, the UEs 109 can be associated with any of the types of vehicles or a person or thing traveling within the bounded geographic area (e.g., a pedestrian). For example, the UE 109 can be a standalone device (e.g., mobile phone, portable navigation device, wearable device, etc.) or installed/embedded in the vehicle 105. In one embodiment, the vehicle 105 and/or UE 109 may be configured with one or more sensors 117 for determining traffic and related data (e.g., weather data, parking data, etc.). By way of example, the sensors 117 may include location sensors (e.g., GPS), accelerometers, compass sensors, gyroscopes, altimeters, etc.

In one embodiment, each vehicle 101 and/or UE 109 is assigned a unique probe identifier (probe ID) for use in reporting or transmitting probe data collected by the vehicles 105 and UEs 109. The vehicles 105 and/or UEs 109, for instance, are part of a probe-based system for collecting probe data for measuring traffic conditions in a road network. In one embodiment, each vehicle 105 and/or UE 109 is configured to report probe data as probe points, which are individual data records collected at a point in time that records telemetry data for that point in time.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 105 may include sensors for reporting and/or measuring any of the parameters or attributes included in the probe data. The attributes can also be any attribute normally collected by an on-board diagnostic (OBD) system of the vehicle, and available through an interface to the OBD system (e.g., OBD II interface or other similar interface).

The probe points can be reported from the vehicles 105 and/or UEs 109 in real-time, in batches, continuously, or at any other frequency requested by the system 100 over, for instance, the communication network 115 for processing by a traffic platform 101 to determine venue-related traffic impacts in real-time or on a batch basis. The probe points also can be mapped to specific road links stored in the geographic database 113. In one embodiment, the probe data can be reported as probe traces or trajectories from the probe points for an individual probe so that the probe traces represent a travel trajectory of the probe through the road network 107. Venue-related trips can then be identified from the probe trajectories for creating influence graphs for venues 103 and corresponding traffic impact data according to the various embodiments described herein.

In one embodiment, travel speed, travel flow, and/or travel volume data that are used for analyzing traffic impacts can be provided by one or more speed sensors operating in the road network 107. For example, the road network 107 may be equipped with sensors including, but not limited to, fixed inductive loop sensors, cameras, radar, and/or other remoting sensing devices capable of determining travel speeds, flows, and/or volumes of vehicles 105, devices 109, etc. traveling in the road network 107. In one embodiment, the sensors can be part of a road monitoring infrastructure that reports travel-speed and other telemetry data (e.g., location, heading, vehicle type, vehicle ID, etc.) to the traffic platform 101 or other monitoring center, in real-time, continuously, in batches, on demand, according to a schedule, etc.

In one embodiment, the traffic platform 101, the vehicles 105, and/or the UEs 109 can interact with a services platform 119 (e.g., an OEM platform), one or more services 121a-121j (also collectively referred to as services 121), one or more content providers 123a-123k (also collectively referred to as content providers 123), or a combination thereof over the communication network 115 to provide functions and/or services related to detecting venue trips and road traffic resulting therefrom according to the various embodiments described herein. The services platform 119, services 121, and/or content providers 123 may provide traffic management services, mapping, navigation, autonomous vehicle operation, and/or other location based services to the vehicles 105 and/or UEs 109.

By way of example, the UE 109 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the traffic platform 101 may be implemented as a cloud based service, hosted solution or the like for performing the above described functions. Alternatively, the traffic platform 101 may be directly integrated for processing data generated and/or provided by the services platform 119, services 121, content providers 125, and/or applications 111. Per this integration, the traffic platform 101 may perform client-side detection of venue trips and related road traffic based on probe data collected in the road network 107 surrounding a venue 103 of interest.

By way of example, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the traffic platform 101 communicates with other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
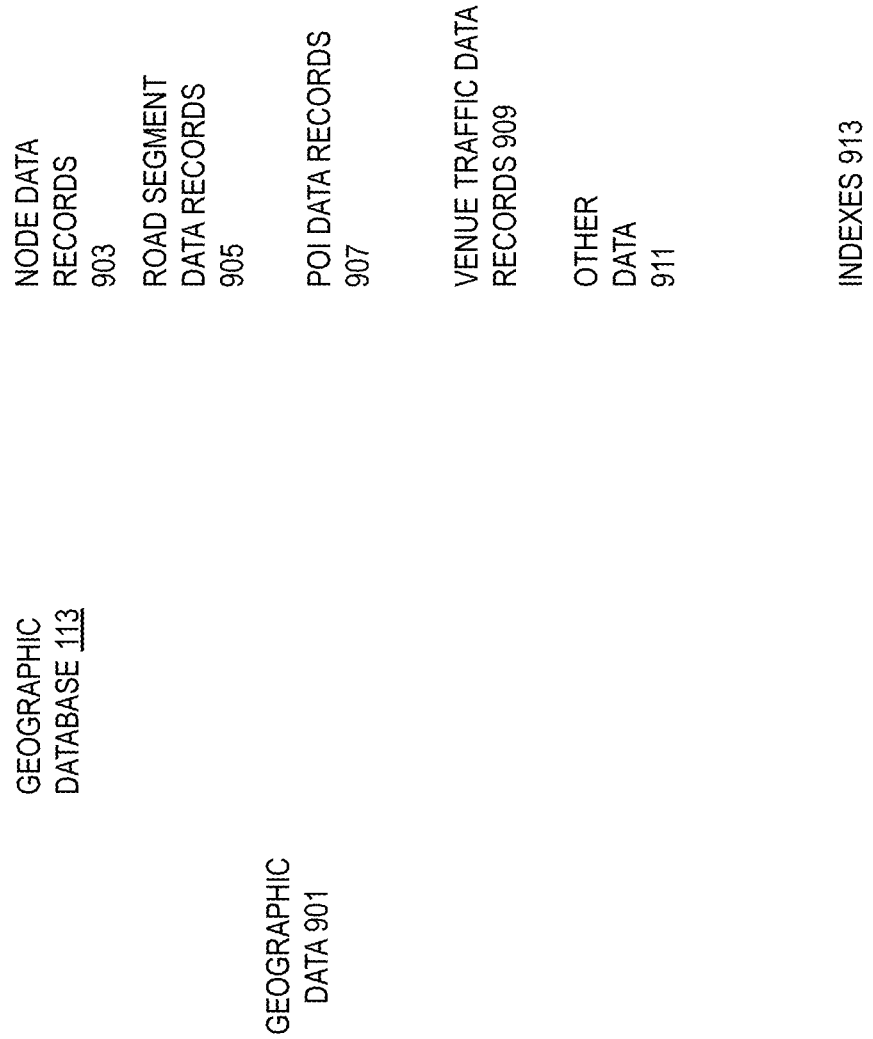
FIG. 9 is a diagram of a geographic database, according to one embodiment.

FIG. 9 is a diagram of the geographic database 113, according to one embodiment. In one embodiment, historical map data (e.g., parking data, traffic data, weather data, map feature data, etc.), the data turbulence and data update frequencies generated according to the various embodiments described herein, and/or any other information used or generated by the system 100 with respect to providing a mad data updates based on a region-specific data turbulence can be stored, associated with, and/or linked to the geographic database 113 or data thereof. In one embodiment, the geographic or map database 109 includes geographic data 901 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 113 includes node data records 903, road segment or link data records 905, POI data records 907, venue traffic data records 909, other data records 911, and indexes 913, for example. More, fewer or different data records can be provided.

In one embodiment, these records store map data and/or features used for publishing and/or visualizing traffic surprise data under various features or contexts according to the embodiments described herein. For example, the features and/or contexts include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 911 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 913 may improve the speed of data retrieval operations in the geographic database 113. In one embodiment, the indexes 913 may be used to quickly locate data without having to search every row in the geographic database 113 every time it is accessed.

In exemplary embodiments, the road segment data records 905 are links or segments representing roads, streets, or paths, as can be used in the calculated route or recorded route information. The node data records 903 are end points corresponding to the respective links or segments of the road segment data records 905. The road link data records 905 and the node data records 903 represent a road network, such as used by vehicles, cars, and/or other entities. Alternatively, the geographic database 113 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 113 can include data about the POIs and their respective locations in the POI data records 907. The geographic database 113 can also include data about places, such as cities, towns, or other communities, and other geographic features, such as bodies of water, mountain ranges, etc. Such place or feature data can be part of the POI data 907 or can be associated with POIs or POI data records 907 (such as a data point used for displaying or representing a position of a city).

In one embodiment, the venue traffic data records 909 can include any data item used by the traffic platform 101 including, but not limited to probe data, venue trips identified from the probe data, historical traffic data, current traffic data, venue influence graphs, and calculated traffic impact data (e.g., traffic impact scores) for specific venues 103 and/or road links. With respect to traffic impact data, the traffic surprise data records 909 can also traffic impact rankings of venues 103 and/or POIs within specified geographic boundaries (e.g., cities, neighborhoods, or any other political/geographic boundary). In addition, the data records 909 can also include records indicating events occurring at venues 103 including, but not limited to, event type (e.g., static or flowing event), start/end times, timeframes or time windows for identifying venue trips for the events or venues (e.g., allowed-arrive timeframes, allowed-leave timeframes, etc.). The traffic surprise data records 909 can also include visualization conventions, preferences, configurations, for visualizing the traffic impact data. In addition, the traffic surprise data records 909 can include the calculated influence weighting factors for one more links or other geographic data records stored in the geographic database 113. As such, the venue traffic data records 909 and/or the computed traffic impacts can be associated with any of the venues, links, map tiles, geographic areas, POIs, political boundaries, etc. represented in the geographic database 113.

The geographic database 113 can be maintained by the content provider in association with the services platform 119 (e.g., a map developer). The map developer can collect geographic data 901 to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data 901 in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 105 and/or UE 109).

For example, geographic data 901 or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a vehicle 105 and/or UE 109 (e.g., via a navigation application 111), for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., the vehicles 105 and/or UEs 109) to provide mapping-related functions including estimations of traffic impacts of events occurring at venues 103 according to the various embodiments described herein. For example, the geographic database 113 can be used with the end user device (e.g., UE 109 and/or other client device) to provide an end user with venue traffic impact data via a mapping user interface, traffic management user interface, and/or any other type of user interface capable of presenting venue traffic impact data. In such a case, the geographic database 113 and/or its traffic impact data can be downloaded or stored on the end user device, or the end user device can access the geographic database 113 through a wireless or wired connection (such as via a server and/or the communication network 115), for example.

The processes described herein for detecting venue trips and related road traffic may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
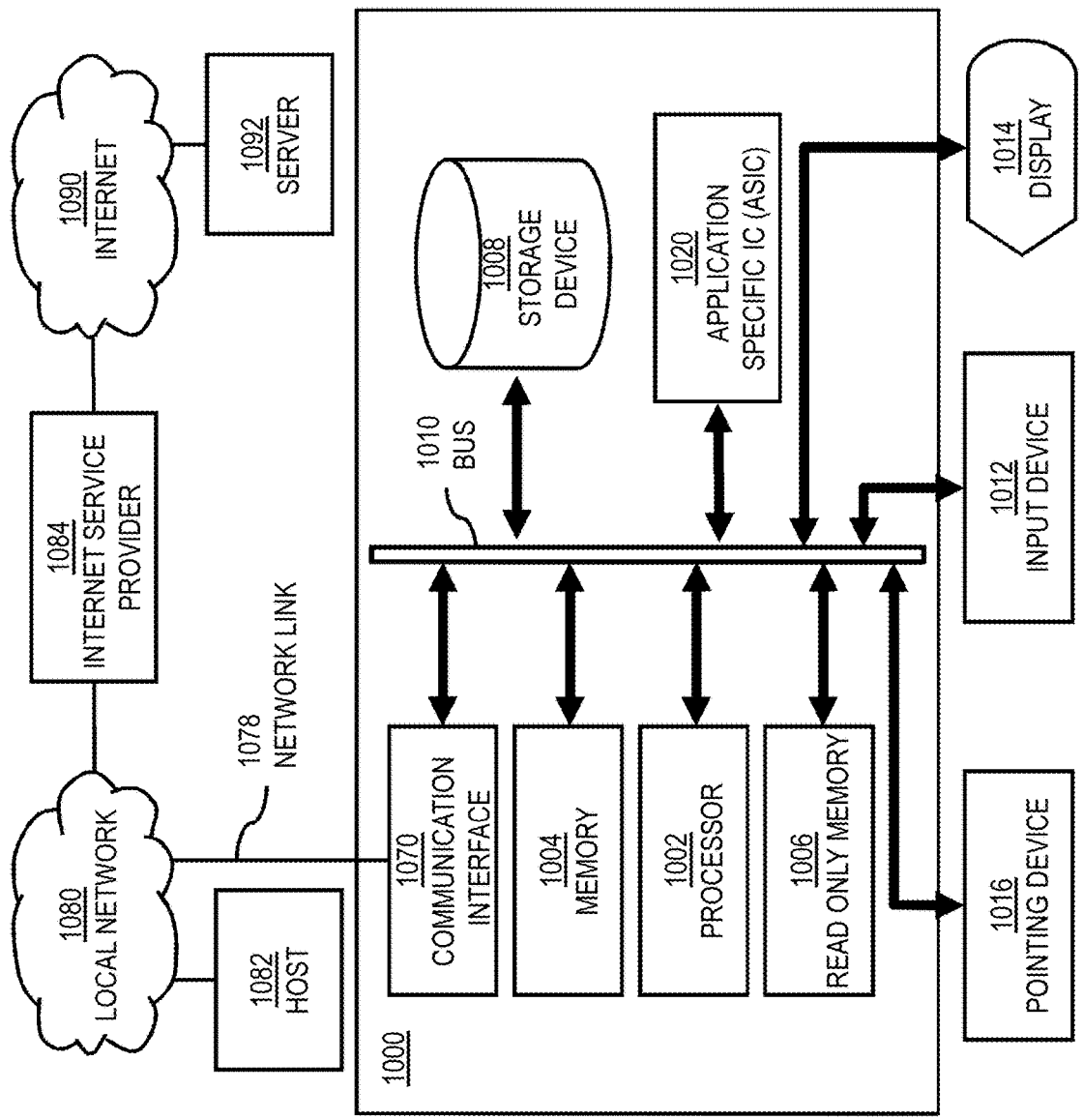
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to detect venue trips and related road traffic as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to detecting venue trips and related road traffic. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for detecting venue trips and related road traffic. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for detecting venue trips and related road traffic, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 115 for detecting venue trips and related road traffic.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to detect venue trips and related road traffic as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to detect venue trips and related road traffic. The memory 1105 also stores the data associated with or generated by the execution of the inventive steps.

Figure 12:
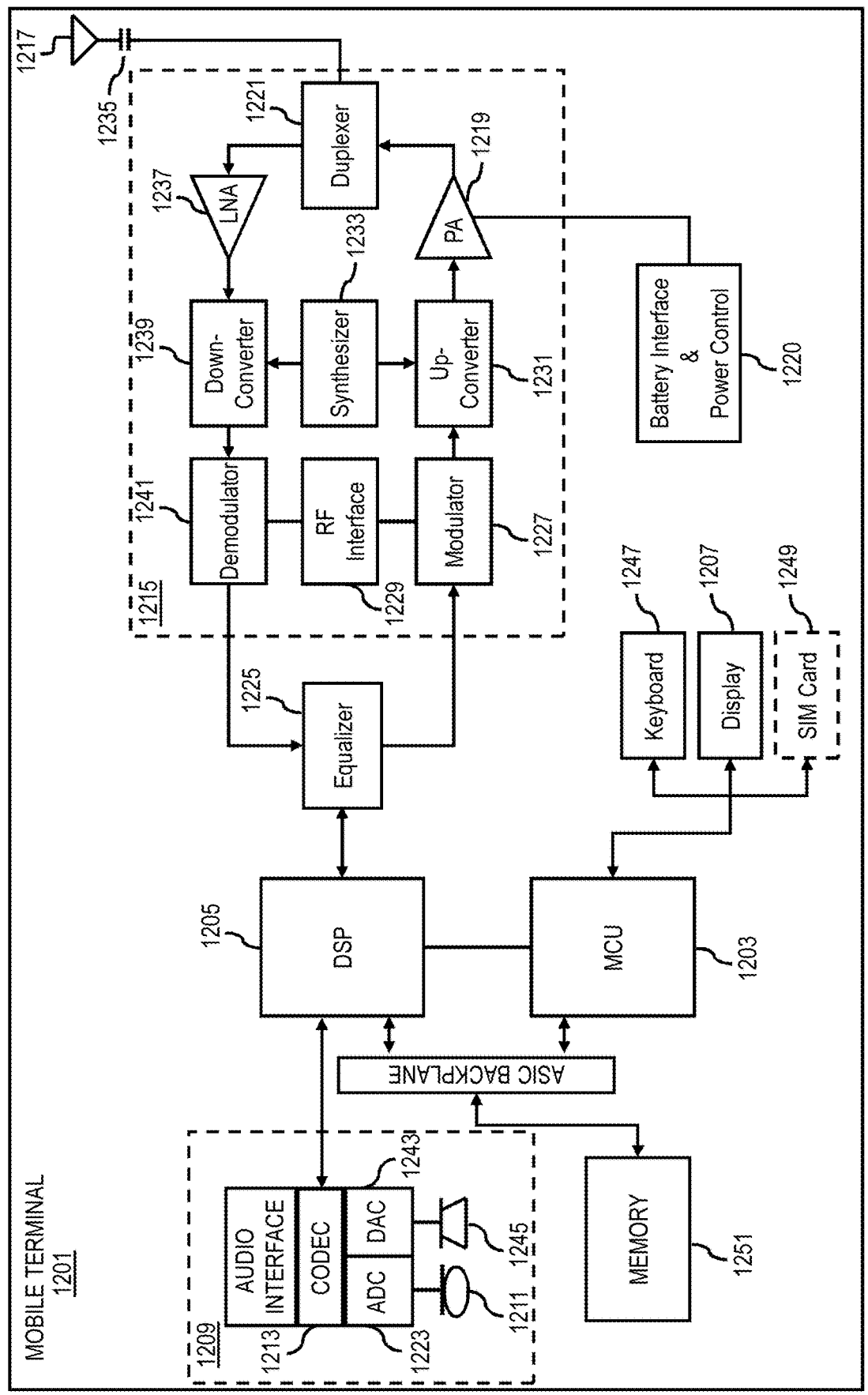
FIG. 12 is a diagram of a mobile terminal (e.g., mobile computer) that can be used to implement an embodiment.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to detect venue trips and related road traffic. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for detecting road traffic resulting from a venue comprising:
    processing probe data to identify a trip related to the venue, wherein the trip is traveled by a probe vehicle generating the probe data within a timeframe associated with an event occurring at the venue;
    generating, by a processor, an influence graph comprising one or more roads used by the probe vehicle during the trip;
    determining, by the processor, a traffic parameter for the one or more roads of the influence graph; and
    computing, by the processor, a traffic impact score for the venue, the event, or a combination thereof based on the traffic parameter.

2. The method of claim 1, further comprising:
    determining a weighting factor respectively for each of the one or more roads based on a count of how many times said each of the one or more roads is traveled in the trip or other venue-related trips occurring in the probe data,
    wherein the traffic impact score is determined by applying the weighting factor to the traffic parameter for said each of the one or more roads.

3. The method of claim 1, further comprising:
    presenting a mapping user interface depicting at least one user interface element indicating the traffic impact score, the change in the traffic parameter, a trip type of the trip, a metric associated with the probe vehicle, or a combination thereof for the one or more roads.

4. The method of claim 1, wherein the timeframe includes an allowed-arrive timeframe, an allowed-leave timeframe, or a combination thereof, the method further comprising:
    determining the allowed-arrive timeframe based on a start time of the event, wherein the trip is identified based on determining that the probe vehicle arrives at the venue within the allowed-arrive timeframe; and
    determining the allowed-leave timeframe based on an end time of the event, wherein the trip is identified based on determining that the probe vehicle leaves the venue within the allowed-leave timeframe.

5. The method of claim 4, further comprising:
    determining a respective length of the allowed-arrive timeframe, the allowed-leave timeframe, or a combination thereof based on an event type of the event,
    wherein the event type includes at least one of a static event type with a fixed length and a flowing event with no fixed length.

6. The method of claim 4, further comprising:
    determining that the trip is a drop-off trip or a pick-up trip with a temporary stop location associated with the venue; and
    determining which portion of the drop-off trip or the pick-up trip to use for determining the one or more roads associated with the trip based on whether the probe vehicle reaches the temporary stop location during the allowed-arrive timeframe or the allowed-leave timeframe.

7. The method of claim 1, wherein the influence graph includes an upstream influence graph comprising the one or more roads that are used by the probe vehicle before arriving at a location associated with the venue, a downstream influence graph based on the one or more roads used by the probe vehicle after leaving the location associated with the venue, or a combination thereof.

8. The method of claim 1, wherein the traffic parameter includes a traffic jam factor, a traffic speed parameter, a traffic volume parameter, or a combination thereof.

9. The method of claim 1, further comprising:
    generating the traffic impact score for a plurality of venues based on real-time probe data; and
    presenting a traffic management user interface to depict a user interface element representing the traffic impact score with respect to the plurality of venues, the one or more roads, or a combination thereof.

10. The method of claim 9, wherein the traffic management user interface provides another user interface element for initiating a traffic engineering change, and wherein the traffic engineering change includes changing a traffic light cycle, changing a travel lane direction, or a combination thereof.

11. An apparatus for detecting road traffic resulting from a venue comprising:
    at least one processor; and
    at least one memory including computer program code for one or more programs,
    the at least one memory and the computer program code configured to, with the at least one processor, cause the apparatus to perform at least the following,
        process, by the at least one processor, probe data to identify a trip related to the venue, wherein the trip is traveled by a probe vehicle generating the probe data within a timeframe associated with an event occurring at the venue;
        generate, by the at least one processor, an influence graph comprising one or more roads used by the probe vehicle during the trip;
        determine, by the at least one processor, a traffic parameter for the one or more roads of the influence graph; and
        compute, by the at least one processor, a traffic impact score for the venue, the event, or a combination thereof based on the traffic parameter.

12. The apparatus of claim 11, wherein the apparatus is further caused to:

determine, by the at least one processor, a weighting factor respectively for each of the one or more roads based on a count of how many times said each of the one or more roads is traveled in the trip or other venue-related trips occurring in the probe data, wherein the traffic impact score is determined by applying the weighting factor to the traffic parameter for said each of the one or more roads.

13. The apparatus of claim 11, wherein the timeframe includes an allowed-arrive timeframe, an allowed-leave timeframe, or a combination thereof, and wherein the apparatus is further caused to:

determine, by the at least one processor, the allowed-arrive timeframe based on a start time of the event, wherein the trip is identified based on determining that the probe vehicle arrives at the venue within the allowed-arrive timeframe; and determine, by the at least one processor, the allowed-leave timeframe based on an end time of the event, wherein the trip is identified based on determining that the probe vehicle leaves the venue within the allowed-leave timeframe.

14. The apparatus of claim 13, wherein the apparatus is further caused to:

determine, by the at least one processor, that the trip is a drop-off trip or a pick-up trip with a temporary stop location associated with the venue; and determine, by the at least one processor, which portion of the drop-off trip or the pick-up trip to use for determining the one or more roads associated with the trip based on whether the probe vehicle reaches the temporary stop location during the allowed-arrive timeframe or the allowed-leave timeframe.

15. The apparatus of claim 11, wherein the influence graph includes an upstream influence graph comprising the one or more roads that are used by the probe vehicle before arriving at a location associated with the venue, a downstream influence graph based on the one or more roads used by the probe vehicle after leaving the location associated with the venue, or a combination thereof.

16. A non-transitory computer-readable storage medium for detecting road traffic resulting from a venue, carrying one or more sequences of one or more instructions which, when executed by one or more processors, cause an apparatus coupled to the one or more processors to perform:

processing, by the one or more processors, probe data to identify a trip related to the venue, wherein the trip is traveled by a probe vehicle generating the probe data within a timeframe associated with an event occurring at the venue;

generating, by the one or more processors, an influence graph comprising one or more roads used by the probe vehicle during the trip;

determining, by the one or more processors, a traffic parameter for the one or more roads of the influence graph; and computing, by the one or more processors, a traffic impact score for the venue, the event, or a combination thereof based on the traffic parameter.

17. The non-transitory computer-readable storage medium of claim 16, wherein the apparatus is further caused to perform:

determining, by the one or more processors, a weighting factor respectively for each of the one or more roads based on a count of how many times said each of the one or more roads is traveled in the trip or other venue-related trips occurring in the probe data, wherein the traffic impact score is determined by applying the weighting factor to the traffic parameter for said each of the one or more roads.

18. The non-transitory computer-readable storage medium of claim 16, wherein the timeframe includes an allowed-arrive timeframe, an allowed-leave timeframe, or a combination thereof, and wherein the apparatus is further caused to perform:

determining, by the one or more processors, the allowed-arrive timeframe based on a start time of the event, wherein the trip is identified based on determining that the probe vehicle arrives at the venue within the allowed-arrive timeframe; and determining, by the one or more processors, the allowed-leave timeframe based on an end time of the event, wherein the trip is identified based on determining that the probe vehicle leaves the venue within the allowed-leave timeframe.

19. The non-transitory computer-readable storage medium of claim 18, wherein the apparatus is further caused to perform:

determining, by the one or more processors, that the trip is a drop-off trip or a pick-up trip with a temporary stop location associated with the venue; and determining, by the one or more processors, which portion of the drop-off trip or the pick-up trip to use for determining the one or more roads associated with the trip based on whether the probe vehicle reaches the temporary stop location during the allowed-arrive timeframe or the allowed-leave timeframe.

20. The non-transitory computer-readable storage medium of claim 16, wherein the influence graph includes an upstream influence graph comprising the one or more roads that are used by the probe vehicle before arriving at a location associated with the venue, a downstream influence graph based on the one or more roads used by the probe vehicle after leaving the location associated with the venue, or a combination thereof.

* * * * *